United States Patent
Krause et al.

(10) Patent No.: US 10,391,430 B2
(45) Date of Patent: Aug. 27, 2019

(54) FILTER ASSEMBLY

(71) Applicant: General Electric Company, Schenectady, NY (US)

(72) Inventors: Andrew Reinhard Krause, Louisville, KY (US); Gregory Sergeevich Chernov, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 397 days.

(21) Appl. No.: 14/859,424

(22) Filed: Sep. 21, 2015

(65) Prior Publication Data

US 2017/0080363 A1   Mar. 23, 2017

(51) Int. Cl.
  *B01D 35/143*   (2006.01)
  *F25D 23/12*   (2006.01)

(52) U.S. Cl.
  CPC .......... *B01D 35/143* (2013.01); *F25D 23/12* (2013.01); *B01D 2201/56* (2013.01)

(58) Field of Classification Search
  CPC .... B01D 35/143; B01D 2201/56; F25D 23/12
  USPC .......................................................... 210/91
  See application file for complete search history.

(56) References Cited

U.S. PATENT DOCUMENTS

| | | |
|---|---|---|
| 3,995,636 A | 12/1976 | Murray et al. |
| 4,497,707 A | 2/1985 | Anderson |
| 4,521,309 A | 6/1985 | Pall |
| 4,619,677 A | 10/1986 | Matheson et al. |
| 4,855,077 A | 8/1989 | Shikinami et al. |
| 4,912,942 A | 4/1990 | Katterhenry et al. |
| 5,089,144 A | 2/1992 | Ozkahyaoglu et al. |
| 5,135,645 A | 8/1992 | Sklenak et al. |
| 5,171,430 A | 12/1992 | Beach et al. |
| 5,190,666 A | 3/1993 | Bisconte |
| 5,192,424 A | 3/1993 | Beyne et al. |
| 5,328,597 A | 7/1994 | Boldt, Jr. et al. |
| 5,536,264 A | 7/1996 | Hsueh et al. |
| 5,907,958 A | 6/1999 | Coates et al. |
| 6,009,404 A | 12/1999 | Eimer |
| 6,051,144 A | 4/2000 | Clack et al. |
| 6,139,738 A | 10/2000 | Maxwell |
| 6,153,105 A | 11/2000 | Tadlock et al. |

(Continued)

FOREIGN PATENT DOCUMENTS

| | | |
|---|---|---|
| CN | 2514297 Y | 10/2002 |
| EP | 1936305 A2 | 6/2008 |

(Continued)

OTHER PUBLICATIONS

PCT Search Report and Written Opinion PCT/US2014/056282, dated Nov. 27, 2014. (11 pages).

(Continued)

*Primary Examiner* — Robert Clemente
*Assistant Examiner* — Akash K Varma
(74) *Attorney, Agent, or Firm* — Dority & Manning, P.A.

(57) ABSTRACT

A filter assembly includes a manifold and a filter cartridge removably mounted to the manifold. The filter cartridge includes a first cartridge component and a second cartridge component joined to the first cartridge component at a failure interface such that the second cartridge component moves relative to the first cartridge component when the filter cartridge fails.

17 Claims, 4 Drawing Sheets

(56) References Cited

U.S. PATENT DOCUMENTS

| | | |
|---|---|---|
| 6,205,807 B1 | 3/2001 | Broadbent |
| 6,303,031 B1 | 10/2001 | Senner |
| 6,355,177 B2 | 3/2002 | Senner et al. |
| 6,533,926 B2 | 3/2003 | Hawkins et al. |
| 6,537,444 B2 | 3/2003 | Wilberscheid et al. |
| 6,551,503 B2 | 4/2003 | Niers et al. |
| 6,708,518 B1 | 3/2004 | Jones et al. |
| 6,753,783 B2 | 6/2004 | Friedman et al. |
| 6,865,941 B2 | 3/2005 | Gibbs |
| 6,950,032 B1 | 9/2005 | Hewitt et al. |
| 7,062,936 B2 | 6/2006 | Rand et al. |
| 7,067,054 B2 | 6/2006 | Fritze |
| RE39,361 E | 10/2006 | Den Dekker |
| 7,481,917 B2 | 1/2009 | Ikeyama et al. |
| 7,638,042 B2 | 12/2009 | Astle et al. |
| 7,736,495 B2 | 6/2010 | Ikeyama et al. |
| 7,836,708 B2 | 11/2010 | Krause et al. |
| 7,874,457 B2 | 1/2011 | Sowers et al. |
| 8,025,186 B2 | 9/2011 | Lee et al. |
| 8,057,669 B2 * | 11/2011 | Beard .................. B01D 29/114 210/232 |
| 8,118,997 B2 | 2/2012 | Ebrom et al. |
| 8,196,809 B2 | 6/2012 | Thorstensson |
| 8,216,463 B1 | 7/2012 | Baird |
| 8,240,159 B2 | 8/2012 | Prabhakar et al. |
| 8,242,893 B1 | 8/2012 | Lin |
| 8,282,820 B2 | 10/2012 | Cur et al. |
| 8,289,173 B2 | 10/2012 | Ben-Mansour et al. |
| 8,459,047 B2 | 6/2013 | Hall et al. |
| 8,544,291 B2 | 10/2013 | Kim et al. |
| 8,695,371 B2 | 4/2014 | Boarman et al. |
| 8,746,003 B2 | 6/2014 | Yoon |
| 8,844,314 B2 | 9/2014 | Bortoletto et al. |
| 8,950,197 B2 | 2/2015 | Bortoletto et al. |
| 9,046,299 B2 | 6/2015 | An et al. |
| 9,074,802 B2 | 7/2015 | Culley et al. |
| 9,074,803 B2 | 7/2015 | Culley |
| 9,080,800 B2 | 7/2015 | Culley |
| 9,151,527 B2 | 10/2015 | Boarman et al. |
| 9,273,890 B2 | 3/2016 | Bortoletto et al. |
| 9,303,903 B2 | 4/2016 | Boarman et al. |
| 9,506,682 B2 | 11/2016 | Yun et al. |
| 10,072,888 B2 | 9/2018 | Jeong et al. |
| 2002/0189983 A1 | 12/2002 | Guess et al. |
| 2004/0001991 A1 | 1/2004 | Kinkelaar et al. |
| 2004/0007516 A1 | 1/2004 | Fritze et al. |
| 2004/0025527 A1 | 2/2004 | Takahashi et al. |
| 2004/0251210 A1 | 12/2004 | Fritze et al. |
| 2005/0092070 A1 | 5/2005 | Bhatti |
| 2005/0167352 A1 | 8/2005 | Burrows et al. |
| 2005/0194317 A1 | 9/2005 | Ikeyama et al. |
| 2006/0011523 A1 | 1/2006 | Schrott et al. |
| 2006/0060512 A1 | 3/2006 | Astle et al. |
| 2006/0186031 A1 | 8/2006 | Fick et al. |
| 2008/0034761 A1 | 2/2008 | Hartley |
| 2008/0055112 A1 | 3/2008 | McGinty et al. |
| 2009/0046715 A1 | 2/2009 | McCoy |
| 2009/0134074 A1 | 5/2009 | Doran |
| 2009/0293508 A1 | 12/2009 | Rafalovich et al. |
| 2010/0100026 A1 | 4/2010 | Morris |
| 2010/0218540 A1 | 9/2010 | McCollough et al. |
| 2010/0275633 A1 | 11/2010 | An et al. |
| 2011/0036109 A1 * | 2/2011 | Krause .................. F25D 23/126 62/126 |
| 2011/0036782 A1 | 2/2011 | DiLeo |
| 2011/0062060 A1 | 3/2011 | Royal et al. |
| 2011/0126576 A1 | 6/2011 | Jeong |
| 2012/0118001 A1 | 5/2012 | Mitchell et al. |
| 2012/0130330 A1 | 5/2012 | Wilson et al. |
| 2012/0297817 A1 | 11/2012 | Krause et al. |
| 2012/0324914 A1 | 12/2012 | Bortoletto et al. |
| 2013/0008838 A1 | 1/2013 | Burke et al. |
| 2013/0068673 A1 | 3/2013 | Maggiore et al. |
| 2013/0240431 A1 | 9/2013 | Foix et al. |
| 2014/0018727 A1 | 1/2014 | Burbank et al. |
| 2014/0110331 A1 | 4/2014 | Baird |
| 2014/0158638 A1 | 6/2014 | Caulkins et al. |
| 2014/0200538 A1 | 7/2014 | Euliano et al. |
| 2014/0305930 A1 | 10/2014 | Heizer et al. |
| 2014/0353235 A1 | 12/2014 | Sherman et al. |
| 2015/0101669 A1 | 4/2015 | Krause et al. |
| 2015/0102931 A1 | 4/2015 | Chernov et al. |
| 2015/0135758 A1 | 5/2015 | Miller |
| 2015/0192338 A1 | 7/2015 | Knatt |
| 2015/0290567 A1 | 10/2015 | Chernov et al. |
| 2015/0290568 A1 | 10/2015 | Chernov et al. |
| 2015/0290569 A1 | 10/2015 | Chernov et al. |
| 2016/0025406 A1 | 1/2016 | An |

FOREIGN PATENT DOCUMENTS

| | | |
|---|---|---|
| JP | 2001016025 A | 1/2001 |
| JP | 2003192096 A | 7/2003 |
| JP | 3665260 B2 | 6/2005 |
| JP | 2006258684 A | 9/2006 |
| JP | 2007147356 A | 6/2007 |
| JP | 2007163255 A | 6/2007 |
| KR | 20120120844 A | 11/2012 |
| WO | WO 83/02523 A1 | 7/1983 |
| WO | WO 97/38272 A1 | 10/1997 |
| WO | WO 03/011426 A1 | 2/2003 |
| WO | WO 03/084875 A1 | 10/2003 |
| WO | WO 2004/037383 A1 | 5/2004 |
| WO | WO 2007068506 A1 | 6/2007 |
| WO | WO 2008061179 A2 | 5/2008 |
| WO | WO 2008/125530 A1 | 10/2008 |

OTHER PUBLICATIONS

PCT Search Report and Written Opinion PCT/US2014/060223, dated Jan. 23, 2015. (9 pages).

* cited by examiner

FILTER ASSEMBLY

FIELD OF THE INVENTION

The present subject matter relates generally to filter assemblies, such as filter assemblies for refrigerator appliances.

BACKGROUND OF THE INVENTION

Certain water filter assemblies include a manifold and a filter cartridge. The manifold directs unfiltered water into the filter cartridge and filtered water out of the filter cartridge. The filter cartridge includes a filter medium, such as an activated carbon block, a pleated polymer sheet, a spun cord material, or a melt blown material. The filter medium is positioned within the filter cartridge and filters water passing therethrough.

Over time, the filter cartridge is subject to fatigue from repeated loading and unloading of fluid pressure within the filter cartridge, and the filter cartridge is susceptible to failure, such as bursting, due to material fatigue. The filter cartridge can also be exposed to a variety of temperatures that can lead to filter cartridge failure. As an example, the filter cartridge may be exposed to freezing conditions, and water within the filter cartridge can freeze. In such conditions, the filter cartridge is also susceptible to failure, such as bursting, due to expansion of water within the filter cartridge.

During filter cartridge failures, water may leak from the filter cartridge and negatively affect surrounding items. Such failures can also be difficult to detect. In particular, water filter assemblies are often positioned in relatively remote locations within refrigerator appliances such that visually monitoring the water filter assemblies for leaks can be difficult or infrequent. Similar problems can make detecting liquid water and water leaks difficult in other circumstances and locations as well.

Accordingly, a system for detecting filter cartridge failure would be useful. In addition, a system for detecting filter cartridge failure and terminating water flow to the filter cartridge would be useful.

BRIEF DESCRIPTION OF THE INVENTION

The present subject matter provides a filter assembly. The filter assembly includes a manifold and a filter cartridge removably mounted to the manifold. The filter cartridge includes a first cartridge component and a second cartridge component joined to the first cartridge component at a failure interface such that the second cartridge component moves relative to the first cartridge component when the filter cartridge fails. The filter assembly also includes features for detecting when the filter cartridge fails and the second cartridge component moves relative to the first cartridge component. Additional aspects and advantages of the invention will be set forth in part in the following description, or may be apparent from the description, or may be learned through practice of the invention.

In a first exemplary embodiment, a filter assembly is provided. The filter assembly includes a manifold. A filter cartridge is removably mounted to the manifold. The filter cartridge includes a first cartridge component and a second cartridge component joined to the first cartridge component at a failure interface such that the second cartridge component moves relative to the first cartridge component when the filter cartridge fails. An RFID tag mounted to the second cartridge component. An RFID reader is capable of signal communication with the RFID tag. The RFID reader is positioned and oriented such that signal communication between the RFID tag and the RFID reader is interrupted when the filter cartridge fails and the second cartridge component moves relative to the first cartridge component.

In a second exemplary embodiment, a filter assembly is provided. The filter assembly includes a manifold. A filter cartridge is removably mounted to the manifold. The filter cartridge includes a first cartridge component and a second cartridge component joined to the first cartridge component at a failure interface such that the second cartridge component moves relative to the first cartridge component when the filter cartridge fails. The filter assembly also includes means for detecting when the filter cartridge fails and the second cartridge component moves relative to the first cartridge component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
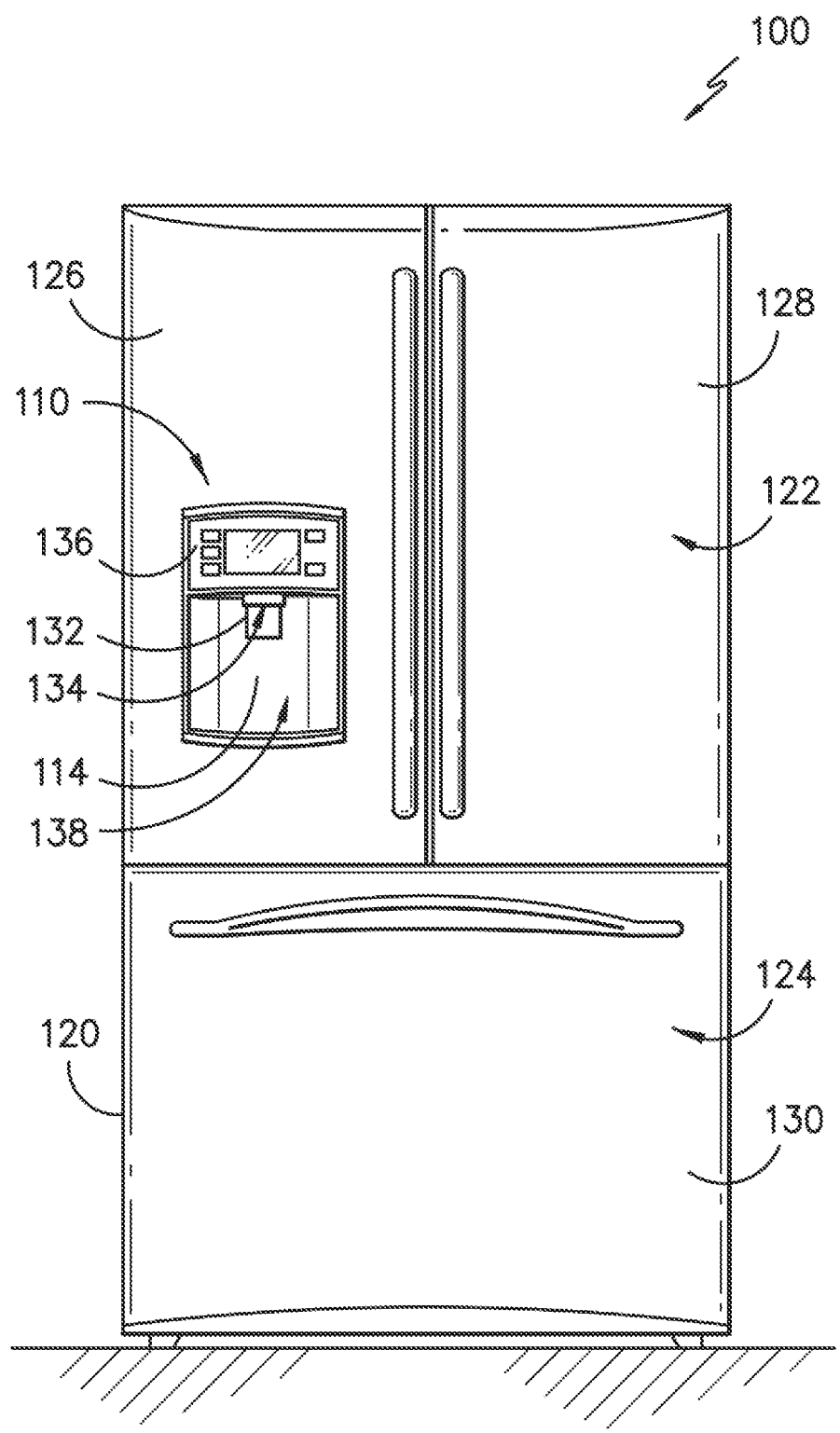
FIG. 1 provides a front view of an exemplary refrigerator appliance.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a front view of an exemplary embodiment of a refrigerator appliance 100 as may be equipped with an exemplary fluid filter assembly of the present invention. However, as will be understood using the teachings disclosed herein, the fluid filter assembly (including the filter cartridge) of the present invention may be used with other refrigerator appliance configurations as well as other types of appliances. It may also be used in applications other than appliances as well. For example, the filtering system of the present invention may be installed under a kitchen sink or as part of a whole housing filtration system. As such, refrigerator appliance 100 is provided only by way of example of an application of the exemplary fluid filter assembly of the present subject matter.

Refrigerator appliance 100 includes a cabinet or housing 120 defining an upper fresh food chamber 122 and a lower freezer chamber 124 arranged below the fresh food chamber 122. As such, refrigerator appliance 100 is generally referred to as a bottom mount refrigerator. In this exemplary embodiment, housing 120 also defines a mechanical compartment (not shown) for receipt of a sealed cooling system. Using the teachings disclosed herein, one of skill in the art will understand that the present invention can be used with other types of refrigerators (e.g., side-by-sides).

Refrigerator doors 126, 128 are rotatably hinged to an edge of housing 120 for accessing fresh food chamber 122. A freezer door 130 is arranged below refrigerator doors 126, 128 for accessing freezer chamber 124. In the exemplary embodiment, freezer door 130 is coupled to a freezer drawer (not shown) that is slidably mounted within freezer chamber 124.

Refrigerator appliance 100 includes a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. An activation member 132 is mounted below discharging outlet 134 for operating dispenser 114. In FIG. 1, activation member 132 is shown as a paddle. However, activation member 132 may be any other suitable mechanism for signaling or initiating a flow of ice and/or water into a container within dispenser 114, e.g., a switch or button. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and activation member 132 are an external part of dispenser 114, and are mounted in a recessed portion 138 defined in an outside surface of refrigerator door 126. Recessed portion 138 is positioned at a predetermined elevation convenient for a user to access ice or water and enabling the user to access ice without the need to bend-over and without the need to access fresh food chamber 122. In the exemplary embodiment, recessed portion 138 is positioned at a level that approximates the chest level of a user.

Figure 2:
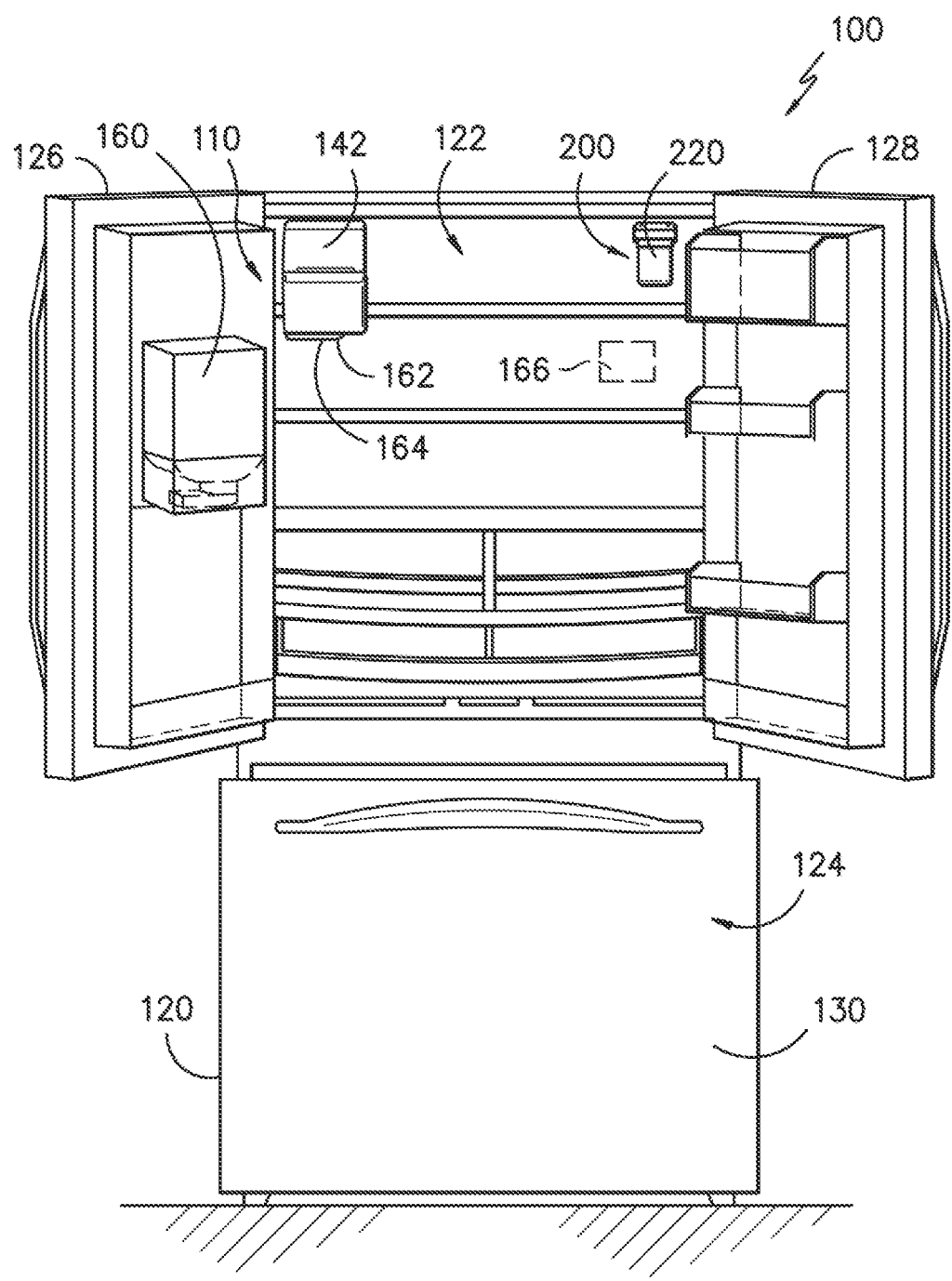
FIG. 2 provides a front view of the exemplary refrigerator appliance of FIG. 1 with refrigerator doors in an open position to shown a filter assembly according to an exemplary embodiment of the present subject matter.

FIG. 2 is a perspective view of refrigerator appliance 100 having refrigerator doors 126, 128 in an open position to reveal the interior of the fresh food chamber 122. As such, certain components of dispensing assembly 110 are illustrated. Dispensing assembly 110 includes an insulated housing 142 mounted within chamber 122. Due to insulation surrounding insulated housing 142, the temperature within insulated housing 142 can be maintained at levels different from the ambient temperature in the surrounding fresh food chamber 122.

In particular, insulated housing 142 is constructed and arranged to operate at a temperature that facilitates producing and storing ice. Insulated housing 142 contains an ice maker (not shown) for creating ice and feeding the same to a receptacle 160 that is mounted on refrigerator door 126. As illustrated in FIG. 2, receptacle 160 is placed at a vertical position on refrigerator door 126 that will allow for the receipt of ice from a discharge opening 162 located along a bottom edge 164 of insulated housing 142 when refrigerator door 126 is in a closed position (shown in FIG. 1). As refrigerator door 126 is closed or opened, receptacle 160 is moved in and out of position under insulated housing 142.

Operation of the refrigerator appliance 100 is regulated by a controller 166 that is in communication with (or operatively coupled with) user interface panel 136 and/or activation member 132 (shown in FIG. 1). User interface panel 136 provides selections for user manipulation of the operation of refrigerator appliance 100 such as e.g., selections between whole or crushed ice, chilled water, and/or other options as well. In response to user manipulation of the user interface panel 136, controller 166 operates various components of the refrigerator appliance 100. Controller 166 may include a memory and one or more microprocessors, CPUs or the like, such as general or special purpose microprocessors operable to execute programming instructions or microcontrol code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

Controller 166 may be positioned in a variety of locations throughout refrigerator appliance 100 in addition to the location shown in FIG. 2. For example, controller 166 may be located within or beneath the user interface panel 136 on refrigerator door 126. In such an embodiment, input/output ("I/O") signals may be routed between the controller and various operational components of refrigerator appliance 100. In one exemplary embodiment, the user interface panel 136 may represent a general purpose I/O ("GPIO") device or functional block. In another exemplary embodiment, the user interface 136 may include input components, such as one or more of a variety of electrical, mechanical or electro-mechanical input devices including rotary dials, push buttons, and touch pads. The user interface panel 136 may be in communication with the controller via one or more signal lines or shared communication busses.

Refrigerator appliance 100 also includes an exemplary filter assembly or fluid filtration system 200 that filters water coming into refrigerator appliance 100 from a water supply (not shown), such as a municipal water source or a well. Fluid filter assembly 200 can remove contaminants, such as chlorine, chloroform, lead, arsenic, pharmaceuticals, microbes, and/or other undesirable substances, from water supplied to refrigerator appliance 100. In particular, fluid filter assembly 200 can supply filtered water to the ice maker within insulated housing 142 and/or discharging outlet 134. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

For this exemplary embodiment, fluid filter assembly 200 is shown positioned within fresh food chamber 122. However, fluid filter assembly 200 may also be located e.g., on the exterior of refrigerator 100, on a surface adjacent to refrigerator 100, connected into a water supply line (not shown) providing fluid to refrigerator 100, and other locations as well. Also, as stated above, fluid filter assembly 200 may also be located under a sink, configured as part of a whole house filtration system, or otherwise configured for other applications as well.

Figure 3:
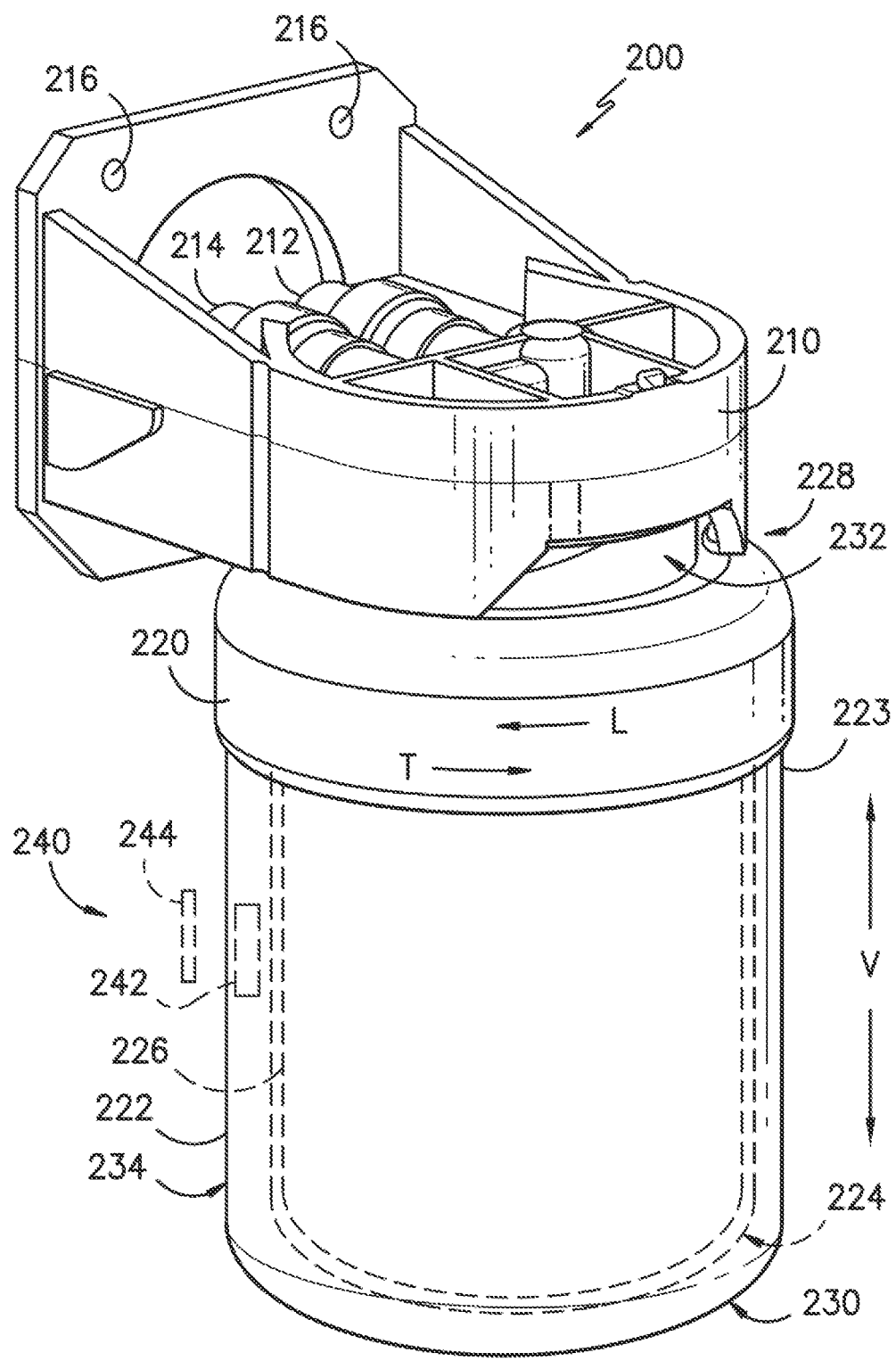
FIG. 3 is a perspective view of the exemplary filter assembly of FIG. 2.

Referring now to FIG. 3, fluid filter assembly 200 includes a manifold 210. A fluid inlet 212 and fluid outlet 214 are provided for a flow of unfiltered fluid into fluid filter assembly 200 and a flow of filtered fluid out of fluid filter assembly 200, respectively. Fluid inlet 212 and fluid outlet 214 are adapted for coupling manifold 210 to a fluid supply system such as e.g., the piping system within a user's dwelling that may be connected with a well or municipal water supply. By way of example, fluid inlet 212 and fluid outlet 214 may be equipped with slip fittings, threads, fasteners, and/or other mechanisms for attachment. Apertures 216 allow for connection of fluid filter assembly 200 to a wall, cabinet, or other surface. Other methods of attachment may also be used.

Fluid filter assembly 200 also includes a filter cartridge 220. Filter cartridge 220 includes a housing or casing 222 that defines an interior volume or chamber 224 into which a filter medium 226 is received. Filter medium 226 may be any suitable filter medium and may constructed from a variety of different types of filter media including textiles, resins, webs, and other components as well. Filtration with filter medium 226 may be based upon e.g., size exclusion, adsorption, and/or other mechanisms. Thus, filter medium 226 may include an activated carbon block, a reverse osmosis membrane, a pleated polymer or cellulose sheet, or a melt blown or spun cord medium. As used herein, the term "unfiltered" describes water that is not filtered relative to filtering medium 226. However, as will be understood by those skilled in the art, fluid filter assembly 200 may include additional filters that filter water entering chamber 224. Thus, "unfiltered" may be filtered relative to other filters but not filter medium 226. While a variety of different constructions may be used, filter medium 226 may be a cylindrically-shaped and configured so that fluid flows radially inward towards a center of filter medium 226 as particulates or other matter are removed by filter medium 226.

Filter cartridge 220 may be mounted to manifold 210. In particular, filter cartridge 220 may be mounted to manifold 210 such that filter cartridge 220 is removable from manifold 210. Any suitable method or mechanism may be used to removably couple filter cartridge 220 to manifold 210. For example, filter cartridge 220 may be threaded to manifold 210. When filter cartridge 220 is mounted to manifold 210, filter cartridge 220 receives unfiltered water received from inlet 212 of manifold 210. Thus, filter cartridge 220 filters water passing through fluid filter assembly 200. Filter cartridge 220 extends between a top portion 228 and a bottom portion 230, e.g., along a vertical direction V. A connection 232 of filter cartridge 220 is positioned at or proximate top portion 228 of filter cartridge 220. Connection 232 of filter cartridge 220 is configured for engaging manifold 210, e.g., in order to removably mount filter cartridge 220 to manifold 210.

Connection 232 of filter cartridge 220 also places filter cartridge 220 in fluid communication with manifold 210 when filter cartridge 220 is mounted to manifold 210. Thus, filter cartridge 220 can receive unfiltered water from inlet 212 of manifold 210 at connection 232 and direct such unfiltered water into chamber 224 when filter cartridge 220 is mounted to manifold 210. Water within chamber 224 can pass through filter medium 226 positioned within chamber 224 and can exit chamber 224 as filtered water. In particular, connection 232 of filter cartridge 220 can direct filtered water out of chamber 224 to outlet 214 of manifold 210 when filter cartridge 220 is mounted to manifold 210. In such a manner, filter medium 226 of filter cartridge 220 can filter a flow of water through water fluid filter assembly 200. Such filtering can improve taste and/or safety of water.

As will be understood by those skilled in the art, filtering medium 226 of filter cartridge 220 can lose efficacy over time. Thus, a user can replace filter cartridge 220 and/or filtering medium 226 of filter cartridge 220 at regular intervals or after a certain volume of water has passed through filter cartridge 220. To replace filter cartridge 220 and/or filtering medium 226 of filter cartridge 220, the user can remove or disconnect filter cartridge 220 from manifold 210 and insert or mount a new filter cartridge 220 or filtering medium 226 of filter cartridge 220.

Fluid filter assembly 200 can be exposed to a variety of conditions within that can negatively affect performance of fluid filter assembly 200. For example, high water pressure at inlet 212 of manifold 210 and/or connection 232 of filter cartridge 220 or exposing fluid filter assembly 200 to freezing conditions can negatively affect performance of fluid filter assembly 200. Such conditions can cause fluid filter assembly 200 to leak, e.g., at connection 232 of filter cartridge 220. Such conditions can also cause fluid filter assembly 200 to deform or crack. As discussed in greater detail below, fluid filter assembly 200 includes features for detecting such malfunctions of fluid filter assembly 200.

Fluid filter assembly 200 includes a system 240 for detecting liquid water. System 240 includes a radio frequency identification reader or RFID reader 244 (shown schematically). System 240 also includes a radio frequency identification tag or RFID tag 242. RFID reader 244 is configured for receiving a signal from RFID tag 242. Thus, RFID reader 244 and RFID tag 242 can be in signal communication with each other as will be understood by those skilled in the art. For example, RFID reader 244 and RFID tag 242 may be in signal communication with each other as described in U.S. patent application Ser. No. 14/052,847 entitled "A Refrigerator Appliance and A Method For Monitoring A Water Filter Assembly Within The Same" and published as US2015/0101669 and/or U.S. patent application Ser. No. 14/052,837 entitled "A System And A Method For Detecting Liquid Water" and published as US2015/0102931, both of which are incorporated by reference herein in their entireties.

In certain exemplary embodiments, RFID tag 242 is a passive RFID tag. Thus, RFID reader 244 can receive a radio signal from RFID tag 242 in response to a query or request signal from RFID reader 244. In particular, RFID tag 242 can generate or transmit the response radio signal utilizing energy transmitted, e.g., wirelessly, to RFID tag 242 from RFID reader 244 via the query or request signal from RFID reader 244. Thus, RFID tag 242 need not include a battery or other power source in order to generate or transmit the response radio signal. In other exemplary embodiments, RFID tag 242 is an active RFID tag and includes a battery or is connected to a suitable power source. Thus, RFID tag 242 can continuously or intermittently generate or transmit a signal that RFID reader 244 can receive. As will be understood by those skilled in the art, RFID reader 244 and RFID tag 242 can have any other suitable setup or configuration for placing RFID reader 244 and RFID tag 242 in signal communication with each other. Thus, RFID reader 244 may be passive or active, and RFID tag 242 may be passive or active depending upon the desired setup of system 240.

As will be understood by those skilled in the art, signal communication between RFID reader 244 and RFID tag 242 is affected by a variety of factors. For example, signal communication between RFID reader 244 and RFID tag 242 can be limited or terminated if a gap between RFID reader 244 and RFID tag 242 is increased. RFID reader 244 and RFID tag 242 can also be tuned such that signal communication between RFID reader 244 and RFID tag 242 is established with a particular transmission medium, such as air, disposed between RFID reader 244 and RFID tag 242, e.g., within the gap between RFID reader 244 and RFID tag 242. Thus, the signal communication between RFID reader 244 and RFID tag 242 can be disrupted or terminated if the transmission medium changes and another material is positioned between RFID reader 244 and RFID tag 242. For example, if water is positioned between RFID reader 244 and RFID tag 242, the signal communication between RFID reader 244 and RFID tag 242 can be terminated or disrupted. In particular, liquid water can absorb radio waves and thereby terminate or disrupt signal communication between RFID reader 244 and RFID tag 242. Liquid water can also affect transmission and reception of radio waves by antennas of RFID reader 244 and/or RFID tag 242. As discussed in greater detail below, when signal communication between RFID reader 244 and RFID tag 242 is disrupted, lost or terminated, it can be inferred that liquid water is disposed between RFID reader 244 and RFID tag 242 (e.g., that liquid water is disposed within the gap between RFID reader 244 and RFID tag 242). For example, when signal communication between RFID reader 244 and RFID tag 242 is interrupted, it can be inferred that fluid filter assembly 200 is leaking or otherwise malfunctioning.

Figure 4:
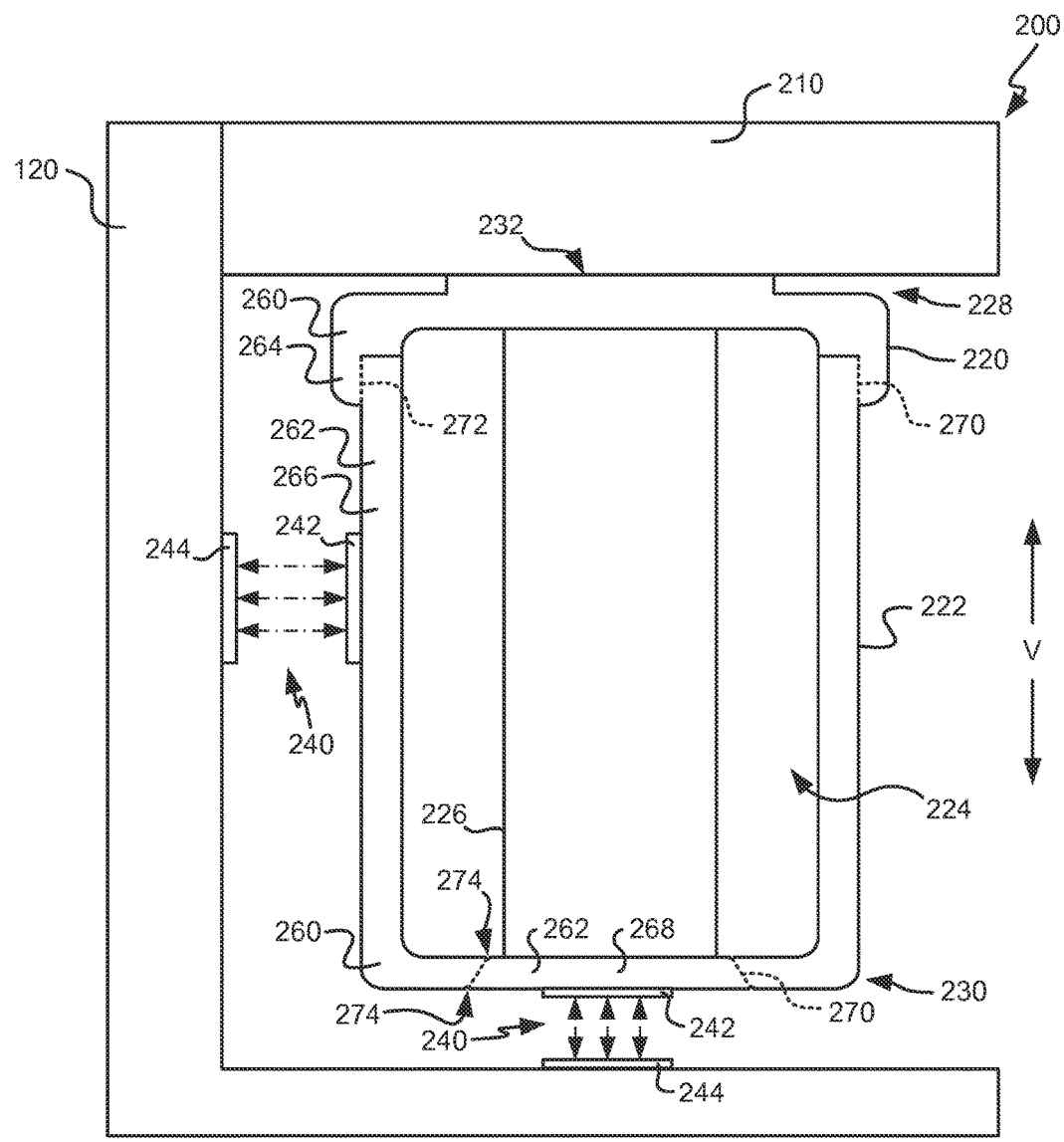
FIG. 4 provides a schematic view of the exemplary filter assembly of FIG. 2.

FIG. 4 provides a schematic view of fluid filter assembly 200. As discussed in greater detail below, fluid filter assembly 200 includes features for detecting when filter cartridge 220 fails. Such features are discussed in greater detail below in the context of FIG. 4.

As may be seen in FIG. 4, fluid filter assembly 200 includes a first cartridge section or component 260 and a second cartridge section or component 262. First and second cartridge components 260 and 262 are joined together at a failure interface 270. Second cartridge component 262 is fixed relative to first cartridge component 260 prior to failure of filter cartridge 220. Conversely, failure interface 270 is configured such that second cartridge component 262 moves relative to first cartridge component 260 (e.g., that is mounted or coupled to manifold 210) when filter cartridge 220 fails. As an example, when liquid water within filter cartridge 220 freezes, the water may expand and filter cartridge 220 may burst such that second cartridge component 262 fractures or separates from first cartridge component 260. As another example, a pressure of water within filter cartridge 220 may repeatedly increase and decrease over time during operation of fluid filter assembly 200, and such pressure changes may lead to mechanical fatigue of filter cartridge 220. Due to such cyclical loading and mechanical fatigue, filter cartridge 220 may burst such that second cartridge component 262 fractures or separates from first cartridge component 260. Thus, failure interface 270 may correspond to a weak area or stress concentration area where mechanical stress within filter cartridge 220 concentrates in order to provide a predictable failure location for filter cartridge 220 when filter cartridge 220 bursts or otherwise mechanically fails.

First and second cartridge components 260 and 262 may correspond to any suitable components of filter cartridge 220 that are joined together at failure interface 270. For example, first cartridge component 260 may correspond to a filter head 264 that is removably mounted to manifold 210, and second cartridge component 262 may correspond to a filter canister 266. Filter head 264 may be generally circular or annular in shape and include inlet and outlet conduits for directing water into and out of chamber 224 of filter cartridge 220. Filter canister 266 may be generally circular or annular in shape as well, and filter medium 226 may be positioned within filter canister 266. Filter canister 266 may be threaded to filter head 264 at failure interface 270, e.g., such that filter canister 266 and filter head 264 collectively define chamber 224 of filter cartridge 220. Thus, filter canister 266 and filter head 264 may be joined together or connected at a threaded interface 272. Threaded interface 272 between filter head 264 and filter canister 266 may correspond to failure interface 270. Thus, e.g., threaded interface 272 may strip or otherwise plastically deform when filter cartridge 220 fails, e.g., such that filter canister 266 separates from filter head 264 at threaded interface 272.

As another example, first cartridge component 260 may correspond to a filter canister 266, and second cartridge component 262 may correspond to a plug 268. Plug 268 may be integrally formed with filter canister 266 as a single piece of material, such as a plastic, or may be a separate piece of material from filter canister 266. Plug 268 may also be positioned at bottom portion 230 of filter cartridge 220. Failure interface 270 may correspond to a notch 274 formed or scoured between filter canister 266 and plug 268. Notch 274 may have a thickness less than adjacent sections of filter canister 266 and plug 268. Thus, notch 274 may assist with concentrating mechanical stress applied to filter cartridge 220, e.g., by fluid pressure within filter cartridge 220. Thus, e.g., notch 274 may plastically deform when filter cartridge 220 fails, e.g., such that plug 268 separates from filter canister 266 at notch 274. Thus, it should be understood that failure interface 270 may assist with concentrating mechanical stress applied to filter cartridge 220, e.g., by fluid pressure within filter cartridge 220, such that second cartridge component 262 moves relative to first cartridge component 260 when filter cartridge 220 fails due to fluid pressure within filter cartridge 220.

Fluid filter assembly 200 also includes features for detecting when filter cartridge 220 fails and/or when second cartridge component 262 moves relative to first cartridge component 260. In the exemplary embodiment shown in FIG. 4, fluid filter assembly 200 includes RFID tag 242 and RFID reader 244, as discussed above. As shown in FIG. 4, RFID tag 242 may be mounted to second cartridge component 262. When second cartridge component 262 moves relative to first cartridge component 260 during filter cartridge 220 failure, RFID tag 242 also moves relative to RFID reader 244, e.g., because RFID tag 242 is mounted to second cartridge component 262 and RFID reader 244 is mounted to housing 120 of refrigerator appliance 100 adjacent fluid filter assembly 200. Thus, signal communication between RFID tag 242 and RFID reader 244 is interrupted when second cartridge component 262 moves relative to first cartridge component 260, and filter cartridge 220 failure can be inferred. In such a manner, RFID tag 242 and RFID reader 244 may be used to detect failure of filter cartridge 220.

Fluid filter assembly 200 may also include other features for detecting when filter cartridge 220 fails and/or when second cartridge component 262 moves relative to first cartridge component 260. For example, a magnet may be mounted to second cartridge component 262, e.g., at the location shown in FIG. 4 for RFID tag 242, and a Hall effect sensor or a reed switch capable of actuating during movement of the magnet mounted to second cartridge component 262. The Hall effect sensor or reed switch may be mounted to housing 120 of refrigerator appliance 100 adjacent fluid filter assembly 200, e.g., at the location shown in FIG. 4 for RFID reader 244. When second cartridge component 262 moves relative to first cartridge component 260 during filter cartridge 220 failure, the magnet also moves relative to the Hall effect sensor or reed switch, e.g., because the magnet is mounted to second cartridge component 262 and the Hall effect sensor or reed switch is mounted to housing 120 of refrigerator appliance 100 adjacent fluid filter assembly 200. Thus, the Hall effect sensor or reed switch may actuate when second cartridge component 262 moves relative to first cartridge component 260, and filter cartridge 220 failure can be inferred. In such a manner, the magnet and the Hall effect sensor or reed switch may be used to detect failure of filter cartridge 220.

As another example, a plunger switch may contact second cartridge component 262, e.g., mounted to second cartridge component 262 at the location shown in FIG. 4 for RFID tag 242 or mounted to housing 120 of refrigerator appliance 100 adjacent fluid filter assembly 200 at the location shown in FIG. 4 for RFID reader 244. When second cartridge component 262 moves relative to first cartridge component 260 during filter cartridge 220 failure, the plunger switch actuates, e.g., because the plunger switch contacts second cartridge component 262. In such a manner, the plunger switch may be used to detect failure of filter cartridge 220.

Detecting failure of filter cartridge 220 may assist with limiting water leakage from fluid filter assembly 200 during filter cartridge 220 failures. For example, a valve may be actuated that terminates fluid flow to fluid filter assembly 200 when filter cartridge 220 failure is detected. In such a manner, performance of fluid filter assembly 200 may be improved.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A filter assembly, comprising:
   a manifold;
   a filter cartridge removably mounted to the manifold, the filter cartridge comprising
      a first cartridge component; and
      a second cartridge component joined to the first cartridge component at a failure interface such that the second cartridge component moves relative to the first cartridge component when the filter cartridge fails, the failure interface comprising a predicted stress concentration area that plastically deforms when the filter cartridge fails while the filter cartridge is mounted to the manifold;
   an RFID tag mounted to the second cartridge component; and
   an MD reader capable of signal communication with the RFID tag, the RFID reader positioned and oriented such that signal communication between the MD tag and the UM reader is interrupted when the filter cartridge fails and the second cartridge component moves relative to the first cartridge component,
   wherein the second cartridge component and the first cartridge component are joined together at the failure interface such that the second cartridge component is fixed relative to the first cartridge component, the second cartridge component fracturing from the first cartridge component at the failure interface when the filter cartridge fails while the filter cartridge is mounted to the manifold.

2. The filter assembly of claim 1, wherein the first cartridge component comprises a filter head removably mounted to the manifold and the second cartridge component comprises a filter canister, the filter canister threaded to the filter head at the failure interface, the filter cartridge further comprising a filter medium disposed within the filter canister.

3. The filter assembly of claim 2, wherein a threaded interface between the filter head and the filter canister strips and the filter head separates from the filter canister when the filter cartridge fails.

4. The filter assembly of claim 1, wherein the first cartridge component comprises a filter canister and the second cartridge component comprises a plug, the plug mounted to the filter canister at a bottom portion of the filter canister, the filter cartridge further comprising a filter medium disposed within the filter canister.

5. The filter assembly of claim 4, wherein the failure interface comprises a notch defined between the filter canister and the plug.

6. The filter assembly of claim 1, wherein the failure interface is configured to concentrate stress applied to the filter cartridge by fluid pressure within the filter cartridge such that the second cartridge component moves relative to the first cartridge component when the filter cartridge fails due to the fluid pressure within the filter cartridge.

7. The filter assembly of claim 6, wherein the failure interface comprises a notch defined between the first cartridge component and the second cartridge component.

8. A filter assembly, comprising:
   a manifold;
   a filter cartridge removably mounted to the manifold, the filter cartridge comprising
      a first cartridge component; and
      a second cartridge component joined to the first cartridge component at a failure interface such that the second cartridge component moves relative to the first cartridge component when the filter cartridge fails, the failure interface comprising a predicted stress concentration area that plastically deforms when the filter cartridge fails while the filter cartridge is mounted to the manifold; and
   means for detecting when the filter cartridge fails and the second cartridge component moves relative to the first cartridge component while the filter cartridge is mounted to the manifold,
   wherein water from the manifold is flowable through the filter cartridge when the filter cartridge is mounted to the manifold.

9. The filter assembly of claim 8, wherein the first cartridge component comprises a filter head removably mounted to the manifold and the second cartridge component comprises a filter canister, the filter canister threaded to the filter head at the failure interface, the filter cartridge further comprising a filter medium disposed within the filter canister.

10. The filter assembly of claim 9, wherein a threaded interface between the filter head and the filter canister strips and the filter head separates from the filter canister when the filter cartridge fails.

11. The filter assembly of claim 8, wherein the first cartridge component comprises a filter canister and the second cartridge component comprises a plug, the plug mounted to the filter canister at a bottom portion of the filter canister, the filter cartridge further comprising a filter medium disposed within the filter canister.

12. The filter assembly of claim 11, wherein the failure interface comprises a notch defined between the filter canister and the plug.

13. The filter assembly of claim 8, wherein the failure interface is configured to concentrate stress applied to the filter cartridge by fluid pressure within the filter cartridge such that the second cartridge component moves relative to the first cartridge component when the filter cartridge fails due to the fluid pressure within the filter cartridge.

14. The filter assembly of claim 13, wherein the failure interface comprises a notch defined between the first cartridge component and the second cartridge component.

15. The filter assembly of claim 8, wherein the means for detecting when filter cartridge fails and the second cartridge component moves relative to the first cartridge component comprises an RFID tag mounted to the second cartridge component and an RFID reader capable of signal communication with the MD tag.

16. The filter assembly of claim 8, wherein the means for detecting when filter cartridge fails and the second cartridge component moves relative to the first cartridge component comprises a magnet mounted to the second cartridge component and a Hall effect sensor or a reed switch capable of actuating during movement of the magnet mounted to the second cartridge component.

17. The filter assembly of claim 8, wherein the means for detecting when filter cartridge fails and the second cartridge component moves relative to the first cartridge component comprises a plunger switch contacting the second cartridge component.

\* \* \* \* \*